2,712,743

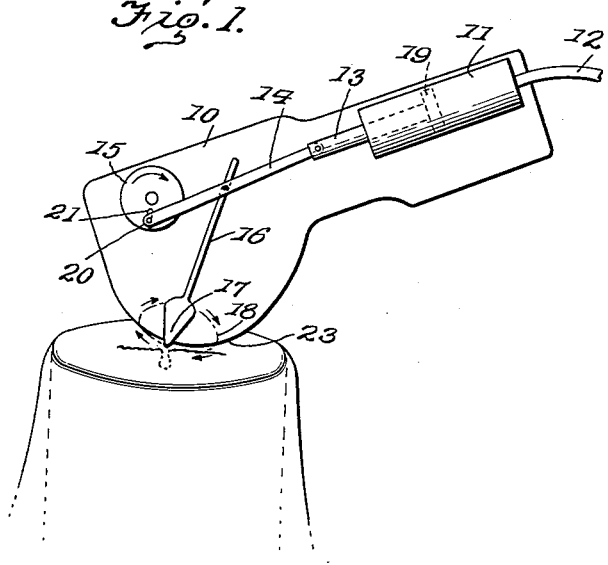
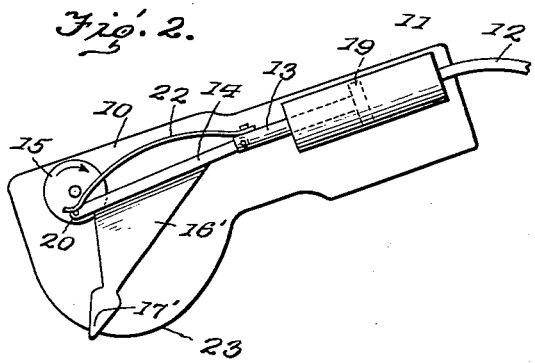

APPARATUS FOR RECTIFYING PULLED THREADS IN KNITTED WARE

Rolf Susemihl, Frankfurt am Main, Germany

Application March 16, 1954, Serial No. 416,675

Claims priority, application Germany October 28, 1953

6 Claims. (Cl. 66—1)

The invention retales to an apparatus for rectifying pulled threads in knitted ware by which a portion of the knitted material which is stretched and contains enlarged and contracted meshes, is subjected to a rapid succession of blows on the wrongly placed meshes until all these meshes have attained their original dimensional size by pulling in and uniformly distributing the pulled thread.

The known apparatus of this type consists substantially of a distributor in the shape of a circular saw or a uniformly operating rim of radially arranged rods bent in the same direction, the ends of which beat the meshes reduced in size by the pulled threads. Owing to their relatively large size and the fact that they obscure the view of the place being worked these known apparatus are open to objection.

The objections of the known apparatus are overcome by the invention, the novel feature of which is that it consists of a piston cylinder preferably mounted on a handy plate, the piston of which cylinder is reciprocated by a column of air produced by a separate mechanical pump and moving to and fro in quick suceession, and is connected to a crank, flywheel or the like by means of a connecting rod rotating in the plane of movement thereof, which carries a beater needle preferably set at an angle to said rod and projecting therefrom.

Other features of the invention are hereinafter described in detail with reference to the accompanying drawing which shows by way of example a preferred form of construction in operative position.

Fig. 1 is a side elevation, partly in perspective, showing the invention in use upon a piece of fabric stretched over a suitable form, and Fig. 2 is a side elevation showing a modification.

On a plate 10 which is easy to handle, a cylinder 11 is arranged in which a piston 19 is reciprocated by a column of air fed through a conduit 12. This column of air is produced by a separate mechanical air pump, not shown in the drawing, and moves to and fro in quick succession. To a rod 13 secured to the piston 19 a connecting rod 14 is linked which, through the intermediary of a bearing 20, engages and rotates a crank, flywheel or the like 15 pivotally mounted on the plate 10. The connecting rod 14 carries a beater needle 16, 17 (Fig. 1) mounted in the plane of movement and projecting therefrom. The beater needle 16, 17 is preferably arranged at an angle to the connecting rod 14 so that when this rod moves the point 17 of the needle carries out an elliptical movement 18. The beater needle 16, 17 may be adjustable in axial direction, oscillatable in the plane of movement of the connecting rod 14 and/or adjustable and fixable in the longitudinal direction thereof. The bearing 20 of the connecting rod 14 on the flywheel 15 may also be adjustable and fixable in radial direction, as indicated by the radial slot 21 in Fig. 1.

There is also the possibility of making the connecting rod 14 and the beater needle 16' in one piece of substantially triangular peripheral shape, whereby the free corner of the triangle forms the beater needle point 17' (see Fig. 2.) By this means a kind of unbalance is produced which, when the apparatus is at a standstill, causes the connecting rod bearing on the flywheel 15 to remain always below the centre of the flywheel, so that when the apparatus starts up the flywheel turns always in the same direction of rotation. It is advisable for this purpose to provide a circular or flat spring 22 which bears lightly against the excentric of the flywheel. In order to reduce the frictional resistance this spring is preferably fixed on the connecting rod 13.

The plate 10 is extended in the range of the needle point and curved at 23 to correspond to the curve described thereby.

From the above detailed description of the invention, it is believed that the construction will at once be apparent, and while there is herein shown and described the preferred embodiment of the invention, it is nevertheless to be understood that minor changes may be made therein without departing from the spirit and scope of the invention as claimed.

I claim:

1. An apparatus for rectifying pulled threads in knitted ware, comprising in combination a plate, a cylinder mounted on said plate, a piston in said cylinder rapidly reciprocated by compressed air, a piston rod secured to said piston, a connecting rod linked at one end to said piston rod, a flywheel mounted on the plate and linked to the other end of said connecting rod, and a beater needle carried at an angle by said connecting rod rotatable in the plane of movement of said connecting rod and adapted to project beyond said plate.

2. An apparatus for rectifying pulled threads in knitted ware, as set forth in claim 1, wherein the connecting rod and the beater needle are made in one piece substantially in the shape of a triangle, the free corner of the triangle forming the point of the beater needle.

3. An apparatus as set forth in claim 1, wherein the beater needle is adjustable in axial direction, oscillatable in its plane of movement and slidably mounted on the connecting rod.

4. An apparatus as set forth in claim 1, wherein the bearing of the connecting rod on the flywheel is arranged radially shiftable and fixable.

5. An apparatus as set forth in claim 1, wherein the plate is extended in the range of the needle point and curved to correspond to the curve described thereby.

6. An apparatus as set forth in claim 1, wherein a spring is provided in contact with the connecting rod bearing.

No references cited.